United States Patent
Ellis et al.

(10) Patent No.: US 9,043,780 B2
(45) Date of Patent: May 26, 2015

(54) ELECTRONIC SYSTEM WITH SYSTEM MODIFICATION CONTROL MECHANISM AND METHOD OF OPERATION THEREOF

(71) Applicant: SMART Storage Systems, Inc., Chandler, AZ (US)

(72) Inventors: Robert W. Ellis, Phoenix, AZ (US); Lace J. Herman, Firestone, CO (US)

(73) Assignee: SMART STORAGE SYSTEMS, INC., Chandler, AZ (US)

( * ) Notice: Subject to any disclaimer, the term of this patent is extended or adjusted under 35 U.S.C. 154(b) by 68 days.

(21) Appl. No.: 13/851,928

(22) Filed: Mar. 27, 2013

(65) Prior Publication Data

US 2014/0298004 A1  Oct. 2, 2014

(51) Int. Cl.
*G06F 9/44* (2006.01)
*G06F 9/445* (2006.01)
*G06F 13/42* (2006.01)

(52) U.S. Cl.
CPC ........... *G06F 9/4411* (2013.01); *G06F 8/61* (2013.01); *G06F 13/42* (2013.01); *G06F 8/65* (2013.01)

(58) Field of Classification Search
CPC ............. G06F 8/65; G06F 8/67; G06F 8/61
USPC .......................... 717/168, 172, 177
See application file for complete search history.

(56) References Cited

U.S. PATENT DOCUMENTS

| | | | |
|---|---|---|---|
| 4,048,481 A | 9/1977 | Bailey, Jr. et al. | |
| 4,839,587 A | 6/1989 | Flatley et al. | |
| 5,034,744 A | 7/1991 | Obinata | |
| 5,210,854 A * | 5/1993 | Beaverton et al. | 717/174 |
| 5,311,395 A | 5/1994 | McGaha et al. | |
| 5,479,638 A | 12/1995 | Assar et al. | |
| 5,930,504 A | 7/1999 | Gabel | |
| 5,949,785 A | 9/1999 | Beasley | |
| 5,963,983 A | 10/1999 | Sakakura et al. | |
| 6,069,827 A | 5/2000 | Sinclair | |
| 6,091,652 A | 7/2000 | Haehn et al. | |
| 6,275,436 B1 | 8/2001 | Tobita et al. | |
| 6,345,367 B1 | 2/2002 | Sinclair | |
| 6,356,447 B2 | 3/2002 | Scafidi | |

(Continued)

FOREIGN PATENT DOCUMENTS

| | | |
|---|---|---|
| EP | 1 956 489 A2 | 8/2008 |
| EP | 1 990 921 A2 | 11/2008 |

(Continued)

OTHER PUBLICATIONS

Cooke, "Introduction to Flash Memory (T1A)," Rash Memory Summit, Aug. 22, 2008, Micron Technology, Inc., 102 pages.

(Continued)

*Primary Examiner* — Phillip H Nguyen
(74) *Attorney, Agent, or Firm* — Morgan, Lewis & Bockius LLP

(57) ABSTRACT

An electronic system and method of operation thereof includes: a control unit for receiving a patterned signal; a recognizer module, coupled to the control unit, for recognizing an unique trigger from the patterned signal; an operation module, coupled to the recognizer module, for detecting an operational mode from the unique trigger; and a change module, coupled to the operation module, for configuring a system state change of a memory sub-system based on the operational mode.

18 Claims, 4 Drawing Sheets

(56) References Cited

U.S. PATENT DOCUMENTS

| | | |
|---|---|---|
| 6,381,670 B1 | 4/2002 | Lee et al. |
| 6,412,080 B1 | 6/2002 | Fleming et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,979,614 B1 | 7/2011 | Yang |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,209,677 B2* | 6/2012 | Shintani et al. ............... 717/172 |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2* | 8/2012 | Cha ............... 725/132 |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,601,203 B2* | 12/2013 | Holbrook et al. ............. 711/103 |
| 8,612,804 B1 | 12/2013 | Kang et al. |
| 2002/0056025 A1 | 5/2002 | Qiu et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1* | 4/2005 | Chen et al. ............... 709/220 |
| 2006/0015683 A1 | 1/2006 | Ashmore et al. |
| 2006/0020745 A1 | 1/2006 | Conley et al. |
| 2006/0136682 A1 | 6/2006 | Haridas et al. |
| 2006/0143365 A1 | 6/2006 | Kikuchi |
| 2006/0143475 A1* | 6/2006 | Herbert et al. ............... 713/191 |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0083779 A1 | 4/2007 | Misaka et al. |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0183918 A1 | 7/2008 | Dhokia et al. |
| 2008/0313505 A1 | 12/2008 | Lee et al. |
| 2009/0019321 A1 | 1/2009 | Radke |
| 2009/0083587 A1 | 3/2009 | Ng et al. |
| 2009/0089485 A1 | 4/2009 | Yeh |
| 2009/0125670 A1 | 5/2009 | Keays |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0172262 A1 | 7/2009 | Olbrich et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0287975 A1 | 11/2009 | Kim et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0128537 A1 | 5/2010 | Suhail et al. |
| 2010/0138592 A1 | 6/2010 | Cheon |
| 2010/0169541 A1 | 7/2010 | Freikorn |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0055468 A1 | 3/2011 | Gonzalez et al. |
| 2011/0066788 A1 | 3/2011 | Eleftheriou et al. |
| 2011/0072423 A1* | 3/2011 | Fukata ............... 717/172 |
| 2011/0078393 A1 | 3/2011 | Lin |
| 2011/0099342 A1 | 4/2011 | Ozdemir |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0145473 A1 | 6/2011 | Maheshwari |
| 2011/0161775 A1 | 6/2011 | Weingarten |
| 2011/0190963 A1 | 8/2011 | Glassl et al. |
| 2011/0191522 A1 | 8/2011 | Condict et al. |
| 2011/0191649 A1 | 8/2011 | Lim et al. |

(56) References Cited

U.S. PATENT DOCUMENTS

| | | |
|---|---|---|
| 2011/0209032 A1 | 8/2011 | Choi et al. |
| 2011/0238892 A1 | 9/2011 | Tsai et al. |
| 2011/0239088 A1 | 9/2011 | Post |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0266048 A1 | 10/2012 | Chung et al. |
| 2012/0324191 A1 | 12/2012 | Strange et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0073788 A1 | 3/2013 | Post et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0124792 A1 | 5/2013 | Melik-Martirosian et al. |
| 2013/0151753 A1 | 6/2013 | Jeon et al. |
| 2013/0238833 A1 | 9/2013 | Vogan et al. |
| 2013/0265825 A1 | 10/2013 | Lassa |
| 2014/0108891 A1 | 4/2014 | Strasser et al. |
| 2014/0129874 A1 | 5/2014 | Zaltsman et al. |
| 2014/0208174 A1 | 7/2014 | Ellis et al. |

FOREIGN PATENT DOCUMENTS

| | | |
|---|---|---|
| JP | 2012129859 A | 7/2012 |
| WO | WO2009/042298 A1 | 4/2009 |
| WO | WO 2011/156466 | 12/2011 |

OTHER PUBLICATIONS

Gal et al., "Algorithms and Data Structures for Flash Memories," ACM Computing Surveys, Jun. 2005, vol. 37, No. 2, 30 pages.

IBM Corporation, "Systems Management, Work Management," Version 5, Release 4, 9th Edition, Feb. 2006, pp. 1-21.

O'Brien, "SMART Storage Systems Optimus SAS Enterprise SSD Review," SMART Storage Systems, Oct. 9, 2012, 44 pages.

Spanjer, "Flash Management—Why and How?" Smart Modular Technologies, Nov. 2009, http:///www.scantec.de/fileadmin/pdf/Smart_Modular/Flash-Management.pdf, 14 pages.

Texas Instruments, "Power Management IC for Digital Set Top Boxes," SLVSA10A, Sep. 2009, pp. 1-22.

International Search Report and Written Opinion dated Dec. 20, 2013, received in PCT/US2013/045282, which corresponds to U.S. Appl. No. 13/493,949, 7 pages (Ellis).

International Search Report and Written Opinion dated Jun. 12, 2014, received in PCT/US2014/018972, which corresponds to U.S. Appl. No. 13/779,352, 12 pages (Schmier).

International Search Report and Written Opinion dated May 14, 2014, received in International Patent Application No. PCT/US2014/017168, which corresponds to U.S. Appl. No. 14/076,115, 6 pages (Fitzpatrick).

International Search Report and Written Opinion dated May 14, 2014, received in International Patent Application No. PCT/US2014/017169, which corresponds to U.S. Appl. No. 14/076,148, 6 pages (Fitzpatrick).

International Search Report and Written Opinion dated Aug. 22, 2014, received in International Patent ApplicatIon No. PCT/US2014/032978, which corresponds to U.S. Appl. No. 14/081,992, 10 pages (Ellis).

International Search Report and Written Opinion dated Nov. 7, 2014, received in International Patent Application No. PCT/US2014/049732, which corresponds to U.S. Appl. No. 14/334,350, 13 pages (Fitzpatrick).

International Search Report and Written Opinion dated Oct. 17, 2014, received in International Patent Application No. PCT/US2014/049734, which corresponds to U.S. Appl. No. 14/332,259, 8 pages (Higgins).

Intgernational Search Report and Written Opinion dated Oct. 23, 2014, received in International Patent Application No. PCT/US2014/049736, which corresponds to U.S. Appl. No. 14/446,249 8 pages (Fitzpatrick).

International Search Report and Written Opinion dated Nov. 5, 2014, received in International Patent Application No. PCT/US2014/049282, which corresponds to U.S. Appl. No. 13/957,407, 12 pages (Fitzpatrick).

Ulinktech, "ATA Command Table (in Alphabetic Order)," Feb. 6, 2011. https://web.archive.org/web/20110206060820/http://www.ulinktech.com/downloads/AT, 6 pages.

International Search Report dated Mar. 25, 2014, received in International Patent Application No. PCT/US2013/072400, which corresponds to U.S. Appl. No. 13/690,337, 3 pages (Ellis).

Invitation to Pay Additional Fees dated Jul. 25, 2014, received in International Patent Application No. PCT/US2014/021290, which corresponds to U.S. Appl. No. 13/791,797, 8 pages (Dean).

International Search Report and Written Opinion dated Jul. 31, 2014, received in International Patent Application No. PCT/US2014/031465, which corresponds to U.S. Appl. No. 13/851,928, 13 pages (Ellis).

International Search Report and Written Opinion dated Jul. 31, 2014, received in International Patent Application No. PCT/US2014/033876, which corresponds to U.S. Appl. No. 13/861,326, 9 pages (Fitzpatrick).

\* cited by examiner

ELECTRONIC SYSTEM WITH SYSTEM MODIFICATION CONTROL MECHANISM AND METHOD OF OPERATION THEREOF

TECHNICAL FIELD

The present invention relates generally to an electronic system and more particularly to a system with system modification control mechanism.

BACKGROUND ART

All electronic systems require some form of memory or storage. Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Recently, forms of long-term storage other than electromechanical hard disks have become feasible for use in computers. One of these is flash Electrically Erasable Programmable Read-Only Memory (EEPROM). Flash EEPROM memory includes a plurality of floating-gate field effect transistors arranged as memory cells. NAND flash is one form of non-volatile memory used in solid-state storage devices. The memory cells are arranged in typical row and column fashion with circuitry for accessing individual cells.

The development of Flash technology has led to the development of Solid State Drives (SSD). Solid State Drives are an alternative to hard disk drives (HDD) and are usually made from flash memory. However, Solid State Drives and other such embedded systems that boot and execute firmware stored in a non-volatile memory require periodic updates. Usually, the update requires physically shorting two electrical points on the hardware, which requires the factory or the customer to have access to these points on a circuit board. This physical method of shorting the hardware for updating can present the risk of permanent damage to the product.

Thus, a need still remains for safer methods of updating and modifying device settings while eliminating the risk of physical and permanent damage to the device. In view of the increasing demand for storage management of electronic systems, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an electronic system, including: receiving a patterned signal; recognizing an unique trigger from the patterned signal; detecting an operational mode from the unique trigger; and configuring a system state change of a memory sub-system based on the operational mode.

The present invention provides an electronic system, including: a control unit for receiving a patterned signal; a recognizer module, coupled to the control unit, for recognizing an unique trigger from the patterned signal; an operation module, coupled to the recognizer module, for detecting an operational mode from the unique trigger; and a change module, coupled to the operation module, for configuring a system state change of a memory-sub-system based on the operational mode.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
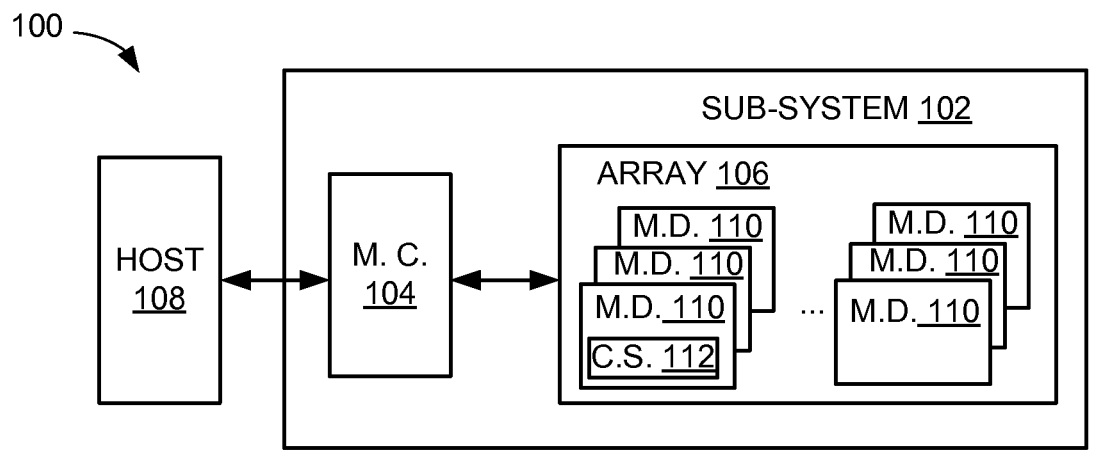
FIG. 1 is an electronic system with system modification control mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include firmware, or hardware running software, or a combination thereof in the present invention in accordance with the context in which the term is used. For example, the software being run by hardware can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with system modification control mechanism in an embodiment of the present invention. The electronic system 100 includes a memory sub-system 102 having a memory controller 104 and a memory array 106. The electronic system 100 includes a host system 108 communicating with the memory sub-system 102.

The memory controller 104 provides data control and management of the memory array 106. The memory controller 104 interfaces with the host system 108 and controls the memory array 106 to transfer data between the host system 108 and the memory array 106.

The memory array 106 includes an array of memory devices 110 including flash memory devices or non-volatile memory devices. The memory array 106 can include pages of data or information. The host system 108 can request the memory controller 104 for reading, writing, and deleting data from or to the logical address space of the storage device that includes the memory array 106.

The memory devices 110 can include chip selects 112, which are defined as control inputs, for enabling the memory devices 110. Each of the chip selects 112 can be used to control the operation of one of the memory devices 110. When the chip selects 112 are enabled, the memory devices 110 are in active state for operation including reading, writing, or recycling. This is also true for sub addresses LUNs (logical units) within a device controlled by one chip select.

Figure 2:
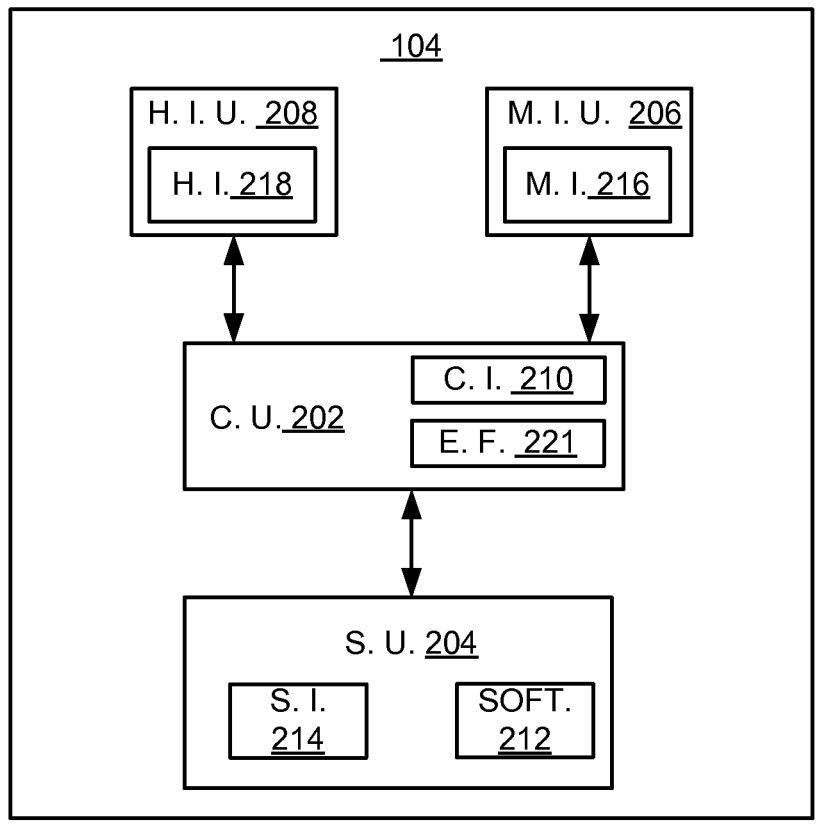
FIG. 2 is an exemplary hardware block diagram of the memory controller.

Referring now to FIG. 2, therein is shown an exemplary hardware block diagram of the memory controller 104. The memory controller 104 can include a control unit 202, a storage unit 204, a memory interface unit 206, and a host interface unit 208. The control unit 202 can include a control interface 210. The control unit 202 can execute software 212 stored in the storage unit 204 to provide the intelligence of the memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The memory controller 104 can include a signal envelope follower 221, which is defined as a circuit used to monitor and produce signals. The signal envelope follower 221 monitors or follows the outline of an alternating current (AC) signal.

The signal envelope follower 221 can use a discrete circuit than the circuit used for the control unit 202 for monitoring and producing signals. The signal envelope follower 221 can also be a component of the control unit 202. The signal envelope follower 221 can also include hardware or software running on hardware for monitoring or following the outline of an AC signal.

The signal envelope follower 221 can monitor continuous wave signals and produce signals including patterned pulses, and signals with direct current envelopes. The signal envelope follower 221 can be configured to recognize unique signals that cannot be recognized by other components of the memory controller 104. For example, the host system 108 of FIG. 1 can also include the signal envelope follower 221 for detecting out-of-band (OOB) signaling and for performing speed negotiation operations.

The control interface 210 can be used for communication between the control unit 202 and other functional units in the memory controller 104. The control interface 210 can also be used for communication that is external to the memory controller 104.

The control interface 210 can receive information from the other functional units or from external sources, or can transmit information to the other functional units or to external destinations. The external sources and the external destinations refer to sources and destinations external to the memory controller 104.

The control interface 210 can be implemented in different ways and can include different implementations depending on which functional units or external units are being interfaced with the control interface 210. For example, the control interface 210 can be implemented with dedicated hardware such is an application-specific integrated circuit (ASIC), configurable hardware such as an FPGA (Field programmable Gate Array), discrete electronic hardware, or a combination thereof.

The storage unit 204 can include hardware, control firmware, and the software 212. The storage unit 204 can contain a volatile memory, a non-volatile memory, an internal memory, an external memory, or a combination thereof. For example, the storage unit 204 can be a non-volatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the memory controller 104. The storage interface 214 can receive information from the other functional units or from external sources, or can transmit information to the other functional units or to external destinations. The external sources and the external destinations refer to sources and destinations external to the memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the memory controller 104. For example, the memory interface unit 206 can permit the memory controller 104 to communicate with the memory array 106 of FIG. 1.

The memory interface unit 206 can include a memory interface 216. The memory interface 216 can be used for communication between the memory interface unit 206 and other functional units in the memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 108 of FIG. 1 to interface and interact with the memory controller 104. The host interface unit 208 can include a host interface 218 to provide communication mechanism between the host interface unit 208 and the host system 108.

The control unit 202 can operate the host interface unit 208 to send control or status information generated by the memory controller 104 to the host system 108. The control unit 202 can also execute the software 212 for the other functions of the memory controller 104. The control unit 202 can further execute the software 212 for interaction with the memory array 106 via the memory interface unit 206.

The functional units in the memory controller 104 can work individually and independently of the other functional units. For illustrative purposes, the memory controller 104 is described by operation of the memory controller 104 with the host system 108 and the memory array 106. It is understood that the memory controller 104, the host system 108, and the memory array 106 can operate any of the modules and functions of the memory controller 104.

Figure 3:
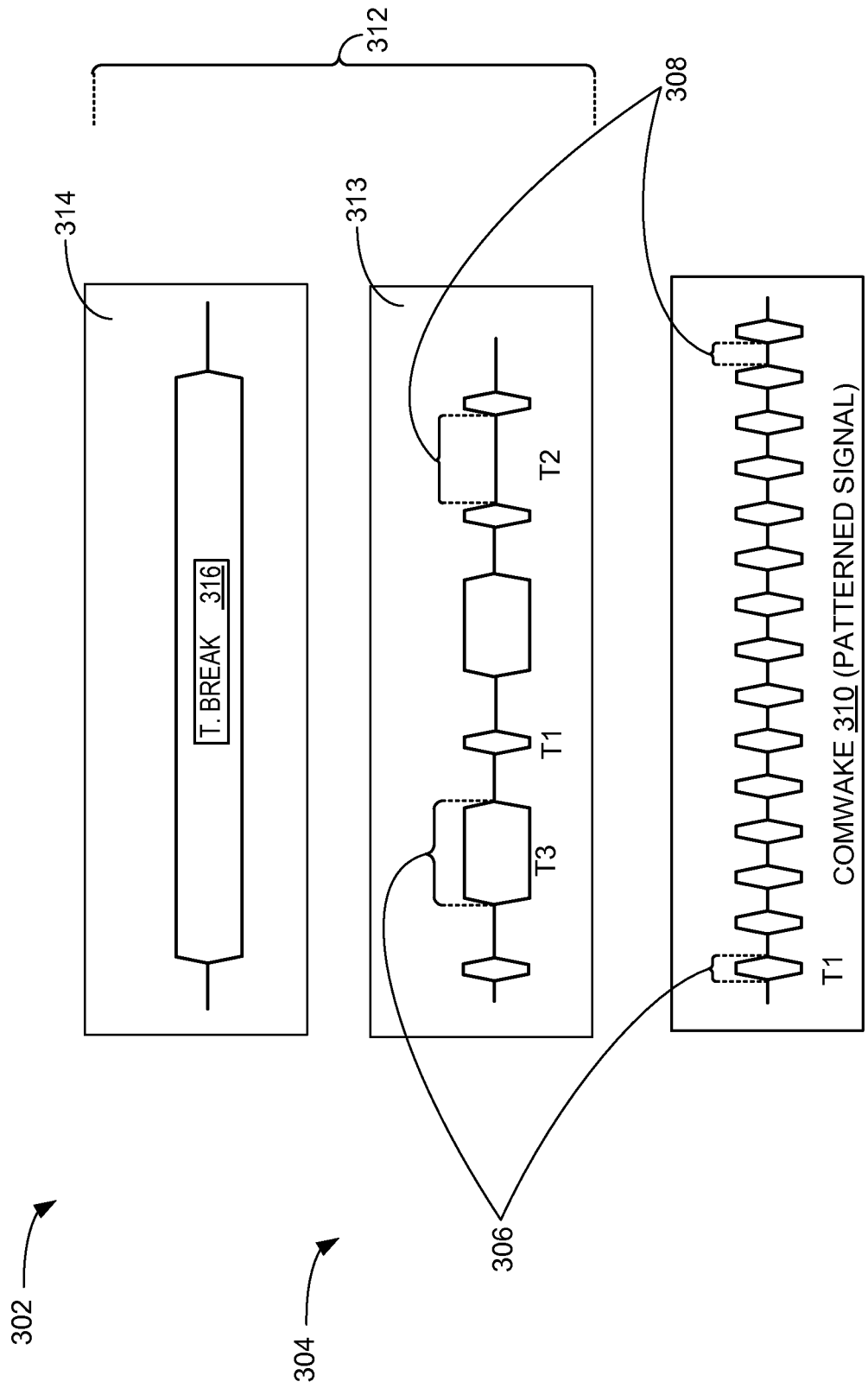
FIG. 3 is an example diagram of the system modification control mechanism of the electronic system of FIG. 1.

Referring now to FIG. 3, therein is shown an example diagram of the system modification control mechanism of the electronic system 100 of FIG. 1. The example includes three sample signals sent from the host system 108 of FIG. 1 to the memory controller 104 of FIG. 1. The signals can include a continuous wave signal, which is defined as a non-modulated base frequency signal wave with a constant amplitude and frequency.

A patterned signal 302 is defined as a continuous wave signal, which includes a pattern of signaling bits for transmission. The patterns of the patterned signal 302 can include active signal envelopes and null signals in specific sequences. The patterned signal 302 can be an out-of-band signal 304 used for communication between components of the electronic system 100.

The patterned signal 302 can include a pulse width time 306 and a pulse separation time 308. The pulse width time 306 is defined as a period of time that a pulse is active or during an active direct current envelope within the signal. For example, the pulse width time 306 can indicate that a pulse is on for a duration of 106.7 nanoseconds or 160 unit interval-out-of-band (UIOOB).

The pulse separation time 308 is defined as a period of time of a null signal or when the pulse is off within the patterned signal 302. The pulse separation time 308 can also have a duration of 106.7 nanoseconds and alternate with the pulse width time 306 to compose the pattern or sequence within the patterned signal 302.

The patterned signal 302 can include a speed negotiation signal 310. The speed negotiation signal 310 is the out-of-band signal 304 used in the speed negotiation protocol of SATA devices. For example, the speed negotiation signal 310 can include COMREST, COMINT, and COMWAKE, which are used for handshaking between the host system 108 and the memory controller 104. Further for example, the speed negotiation signal 310 can include the pulse width time 306 of 106.7 nanoseconds and the pulse separation time 308 of 106.7 nanoseconds as depicted by T1 in the diagram.

The patterned signal 302 can include a unique trigger 312, which is defined as a signal for modifying settings on the memory sub-system 102 of FIG. 1. Instead of being used in speed negotiation, the unique trigger 312 can be used to trigger specific modes of operation or to trigger specific actions in the memory sub-system 102. For example, the unique trigger 312 can trigger a firmware update for the memory sub-system 102.

The signal of the unique trigger 312 can be different from the speed negotiation signal 310 by having different patterns, sequences, frequencies, durations, amplitudes, or a combination thereof. The pulse sequences that are associated with the unique trigger 312 can be used to differentiate the patterned signal 302 from another, such as the SATA protocol signal used for COMWAKE. For example, the durations of the pulse width time 306 can be a ratio from a range of 2:1 to 10:1 to differentiate the unique trigger 312 from the speed negotiation signal 310.

The unique trigger 312 can include a plurality of different signals that are each tied to a specific mode of operation or action to be performed by the memory sub-system 102. For example, the unique trigger 312 can include a first trigger 313 and a second trigger 314 as two examples of the unique trigger 312.

As an example, the first trigger 313 can include a sequence of the pulse width time 306 of T1 and T3 and alternating with the pulse separation time 308 of T2. The duration of T2 can equal 320 nanoseconds/480 UIOOB and the duration of T3 can be three to six times the duration of the T1 time. Because the sequencing of the pulse width time 306 and the pulse separation time 308 of the first trigger 313 is out of characteristic of the speed negotiation signal 310, the risk of false triggering is avoided. For illustrative purposes, the first trigger 313 can be the unique trigger 312 that is tied to executing a system recovery of the memory sub-system 102.

Further for example, the second trigger 314 can include a time break 316, which is a signal with the pulse width time 306 with a long duration. The long duration of the pulse width time 306 of the time break 316 is to distinguish the signal from the speed negotiation signal 310 for preventing false triggering. For illustrative purposes, the second trigger 314 can be the unique trigger 312 that is tied to executing a firmware update of the memory sub-system 102. It is understood that the first trigger 313 and the second trigger 314 can be interchangeable in being tied to specific actions or modes of operation of the electronic system 100.

It has been discovered that the electronic system 100 eliminates the need for physically shorting two electrical points on the hardware boards of storage devices or the need for an overt hardware interaction by using the patterned signal 302 as the unique trigger 312 to modify settings on the electronic system 100. For example, the specific sequences and patterns within the unique trigger 312 can trigger specific modes of operation of the memory sub-system 102 including updating or reverting firmware of the memory sub-system 102. The unique trigger 312 provides an alternative method to physical methods and removes the requirement to disassemble the device to have access to electrical points normally done during pin strapping. Thus, the risk to the electronic system 100 is reduced from the danger of physical damage caused by physical tampering.

It has been discovered that the electronic system 100 can use specific sequences for the unique trigger 312 for special device operations outside normal drive operation such as triggering firmware updates using an out-of-band communications channel. For example, the unique trigger 312 can include the first trigger 313 and the second trigger 314 having different aspect ratios for the pulse width time 306 and the pulse separation time 308 to differentiate the unique trigger 312 from other SATA communication protocols for the prevention of false triggering.

It has been discovered that the time break 316 provides the unique trigger 312 that is out of the specifications for the speed negotiation signal 310, such as COMREST, COMWAKE, or COMINIT signaling, which avoids false triggering. The time break 316 includes the pulse width time 306 that is at least three times the width of the pulse width time 306 for COMREST, COMWAKE, or COMINIT signaling, which prevents false triggering of other operations such as speed negotiation.

Figure 4:
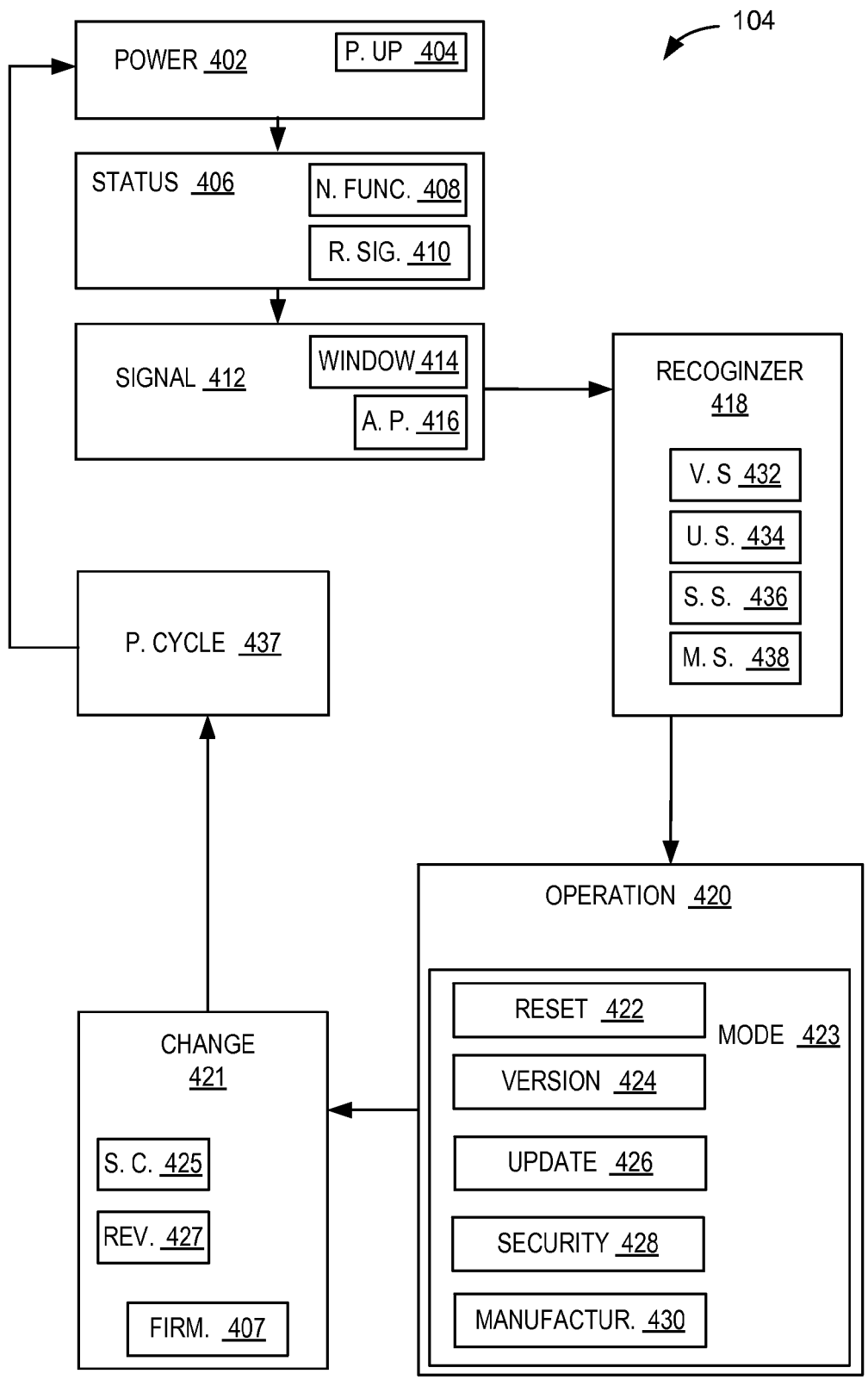
FIG. 4 is a control flow of the memory controller of FIG. 2.

Referring now to FIG. 4, therein is shown a control flow of the memory controller 104 of FIG. 2. The memory controller 104 can include a power module 402, a status module 406, a signal module 412, a recognizer module 418, an operation module 420, a change module 421, and a power cycle module 437.

In the control flow, as an example, each module is indicated by a number and successively higher module numbers follow one another. Control flow can pass from one module to the next higher numbered module unless explicitly otherwise indicated.

The control unit 202 of FIG. 2 can be coupled to the power module 402, the status module 406, the signal module 412, the recognizer module 418, the operation module 420, the change module 421, and the power cycle module 437 for executing the modules. The power module 402 detects a power up 404 of the electronic system 100 of FIG. 1. The power module 402 can be coupled to the status module 406 and the power cycle module 437.

The status module 406 checks the condition or state of the memory sub-system 102 of FIG. 1. For example, the status module 406 can determine that the memory sub-system 102 is in a functioning state and is capable of proceeding with data storage operations. The status module 406 can determine if a firmware 407 of the memory sub-system 102 is functioning properly. The status module 406 can also determine a non-functional state 408 of the memory sub-system 102.

The non-functional state 408 is defined as a firmware failure, which can cause boot up issues with the memory sub-system 102. For example, the non-functional state 408 can indicate that the memory sub-system 102 is corrupted or an incorrect version of the firmware 407 is installed. The non-functional state 408 can be caused by a previous failed attempt at modifying the firmware 407 such as an installation interruption or a power failure during a firmware update.

If the non-functional state 408 is detected, the status module 406 can also generate a revert signal 410. The revert signal 410 is the unique trigger 312 of FIG. 3 for executing a firmware reset for the memory sub-system 102. For example, the memory sub-system 102 can be reverted back to an original factory version of the firmware 407 or reverted back to an earlier valid version of the firmware 407.

The signal module 412 can receive the patterned signal 302 of FIG. 3. For example, the signal module 412 can receive the revert signal 410. The patterned signal 302 can be received from the status module 406 or from the host system 108 of FIG. 1. The host system 108 can also send the patterned signal 302 to the signal module 412. The signal module 412 can be coupled to the status module 406, the recognizer module 418, the signal envelope follower 221 of FIG. 2, and the host system 108.

The signal module 412 can include a window module 414. The window module 414 can determine an available period 416 for the signal module 412 to accept the patterned signal 302. For example, the window module 414 can determine that the available period 416 is at all times while the memory sub-system 102 is operating. For example, the signal envelope follower 221 can be operating in the system background for receiving the patterned signal 302.

Further for example, the window module 414 can determine that the available period 416 is only for a short period after the power up 404. In this example, the patterned signal 302 will not be valid or accepted by the signal module 412 if the patterned signal 302 is sent to the signal module 412 after the available period 416. The available period 416 can be used to prevent unintended or unauthorized uses for increasing the security and the reliability of the electronic system 100.

The recognizer module 418 interprets and recognizes the unique trigger 312 from the patterned signal 302 received by the signal module 412. The recognizer module 418 can differentiate the unique trigger 312 from other examples of the patterned signals 302. For example, the recognizer module 418 can recognize the revert signal 410 as being different from the speed negotiation signal 310 of FIG. 3.

The recognizer module 418 can recognize the patterns within the patterned signal 302 including tracking the pulse width time 306 of FIG. 3 and the pulse separation time 308 of FIG. 3. In one example, the recognizer module 418 can be coupled to the signal envelope follower 221 of for monitoring and recognizing the unique trigger 312 using the control unit 202 of FIG. 2 or a separate and discrete circuit.

For example, the recognizer module 418 can use the signal envelope follower 221 for monitoring the first trigger 313 of FIG. 3 and the second trigger 314 of FIG. 3. The recognizer module 418 can also use a trigger envelope follower, which is a second and dedicated envelope follower than the signal envelope follower 221, for monitoring the patterned signal 302 having the unique trigger 312.

The unique trigger 312 can include a plurality of different signals that are each tied to a specific trigger for modifying operational settings on the memory sub-system 102. For example, the unique trigger 312 can include a version signal 432, an update signal 434, a security signal 436, and a manufacturing signal 438.

The version signal 432 is the unique trigger 312 for changing the firmware 407 of the memory sub-system 102 to a specific version. The update signal 434 is the unique trigger 312 for updating the firmware 407 to the newest available version. The security signal 436 is the unique trigger 312 for enabling and disabling security features of the memory sub-system 102. The manufacturing signal 438 is the unique trigger 312 for enabling and disabling a diagnostic or special factory mode of operation for the memory sub-system 102. The recognizer module 418 can be coupled to the operation module 420 for selecting a mode of operation associated with each of the types of the unique trigger 312.

The version signal 432, the update signal 434, the security signal 436, the manufacturing signal 438, and the revert signal 410 can have a sequence that is similar to the examples of the unique trigger 312 shown in FIG. 3. For illustrate purposes, the version signal 432 can have the same sequence as the first trigger 313 and the update signal 434 can have the same sequence as the second trigger 314.

The recognizer module 418 can also receive and recognize multiple triggers or multiple instances of the unique trigger 312. For example, the recognizer module 418 can receive the first trigger 313, and subsequently the second trigger 314 for modifying two different settings for the memory sub-system 102 in a single power cycle. In this example, the first trigger 313 can enable security features in the memory sub-system 102 and the second trigger 314 can trigger a diagnostic mode of operation within the same power cycle.

The recognizer module 418 can also recognize if the patterned signal 302 includes multiple triggers within the same transmission. For example, the patterned signal 302 received by the signal module 412 can include both the patterns for the first trigger 313 and the second trigger 314. Two different settings for the memory sub-system 102 can be manipulated within a single power cycle using one transmission of the patterned signal 302.

The operation module 420 selects an operational mode 423 for the memory sub-system 102 based on the unique trigger 312 received. The operational mode 423 allows the modification of settings and specific operations of the memory sub-system 102. The operational mode 423 can include modes of operation outside of normal device operation of the electronic system 100. The operation module 420 can be coupled to the change module 421 for executing modifications.

For example, the operational mode 423 can include enabling drive functions including updating the firmware 407, executing special run modes, and modifying security settings. The operational mode 423 can include a reset mode 422, a version mode 424, an update mode 426, a security mode 428, and a manufacturing mode 430.

The reset mode 422 enables a reset of the memory sub-system 102 to an original factory condition including the original version of the firmware. For example, the operational mode 423 can receive the revert signal 410 from the recognizer module 418 for selecting the reset mode 422. While in the reset mode 422, the non-functional state 408 can be removed from the memory sub-system 102 by enabling a reset of the firmware 407 for returning to a functioning state.

The version mode 424 can enable the firmware 407 of the memory sub-system 102 to be changed to any previous version of the firmware 407 stored in the memory sub-system 102. For example, the version mode 424 can enable the memory sub-system 102 to be flashed by any valid version of the firmware 407 that is stored in the storage unit 204 of FIG. 2.

The update mode 426 can enable the firmware 407 of the memory sub-system 102 to be updated to a new version after receiving the unique trigger 312. The new and updated version of the firmware 407 can be stored in the storage unit 204.

The security mode 428 can enable the toggling of secure erase features built into the memory sub-system 102. The security mode 428 can be enabled or disabled after receiving the unique trigger 312 associated with the mode. The security mode 428 can be used for secure erase operations allowing the information in the memory sub-system 102 to be quickly erased or destroyed. The security mode 428 can also be disabled to prevent accidental erasures.

The manufacturing mode 430 can enable the memory sub-system 102 to enter into a manufacturing test environment mode or a diagnostic mode after receiving the unique trigger 312. The manufacturing mode 430 can allow special commands and actions used during the manufacturing stage or repair periods for the memory sub-system 102.

The change module 421 perform a system state change 425 on the memory sub-system 102 based on the operational mode 423 selected by the operation module 420. The system state change 425 is defined as a modification of a setting or modification of the operational mode 423 of the memory sub-system 102. For example, the system state change 425 can be a change from one of the operational mode 423 to another of the operational mode 423.

The system state change 425 can also include a change from the non-functional state 408 to another of the operational mode 423. For example, the change module 421 can execute the processes of the reset mode 422 or the version mode 424 to execute a reversion 427 of the firmware 407. The reversion 427 is defined as a process for reverting the firmware 407 to an original factory version of the firmware 407 or to a previously stored version of the firmware 407. The change module 421 can be coupled to the storage unit 204 for accessing firmware information.

The power cycle module 437 performs a reboot of the memory sub-system 102. The rebooting of the memory sub-system 102 may be necessary after the system state change 425, such as installing a new or different version of the firmware 407. The power cycle module 437 can be coupled to the power module 402 for detecting the power up 404. The status module 406 can check the status of the memory sub-system 102 after a reboot.

The electronic system 100 describes the module functions or order as an example. The modules can be partitioned differently. For example, the power module 402, the status module 406, the signal module 412, the recognizer module 418, the operation module 420, the change module 421, and the power cycle module 437 can be implemented as one module or with lesser number of modules. Each of the modules can operate individually and independently of the other modules.

It has been discovered that the electronic system 100 eliminates the need for physically shorting two electrical points on the hardware boards of storage devices or the need for an overt hardware interaction by using the patterned signal 302 as the unique trigger 312 to modify settings on the electronic system 100. For example, the specific sequences and patterns within the unique trigger 312 can trigger specific modes of operation of the memory sub-system 102 including updating or reverting firmware of the memory sub-system 102. The unique trigger 312 provides an alternative method to physical methods and removes the requirement to disassemble the device to have access to electrical points normally done during pin strapping. Thus, the risk to the electronic system 100 from the danger of physical damage caused by physical tampering is reduced It has been discovered that the electronic system 100 can use specific sequences for the unique trigger 312 for special device operations outside normal drive operation such as triggering an update of the firmware 407 using an out-of-band communications channel. For example, the unique trigger 312 can include the first trigger 313 and the second trigger 314 having different aspect ratios for the pulse width time 306 and the pulse separation time 308 to differentiate the unique trigger 312 from other SATA communication protocols for the prevention of false triggering.

It has been discovered that the patterned signal 302 having the unique trigger 312 associated with different version of the firmware 407 allows for the reversion 427 of any version of the firmware 407 that is available. For example, various versions of the firmware 407 can be stored on the memory sub-system 102 and each version of the firmware 407 can be tied to a different trigger signal. The unique trigger 312 associated with different versions of the firmware 407 allows for flexibility in installing and modifying the firmware 407 on the memory sub-system 102.

It has been discovered that the available period 416 provides security and reliability to the electronic system 100 by determine time periods for accepting the unique trigger 312. For example, the available period 416 can be for all times during operation of the memory sub-system 102 or for a short period after the power up 404. The discovery of the available period 416 can be used to prevent unintended or unauthorized modifications to the electronic system 100.

It has been discovered that the electronic system 100 increases the speed and efficiency of the burn-in and bring-up processes during the manufacturing stage of a large number of devices because the unique trigger 312 can be sent to multiple devices simultaneously. Further for example, the unique trigger 312 sent to the memory controller 104 eliminates the need to attach special cables to each device during a volume manufacturing process and thus also provides additional efficiency to the manufacturing and testing stages of the electronic system 100.

It has been discovered that the time break 316 of FIG. 3 provides the unique trigger 312 that is out of the specifications for the speed negotiation signal 310, such as COMREST, COMWAKE, or COMINIT signaling, which avoids false triggering. The time break 316 includes the pulse width time 306 that is at least three times the width of the pulse width time 306 for COMREST, COMWAKE, or COMINIT signaling, which prevents fails triggering of other operations such as speed negotiation.

Figure 5:
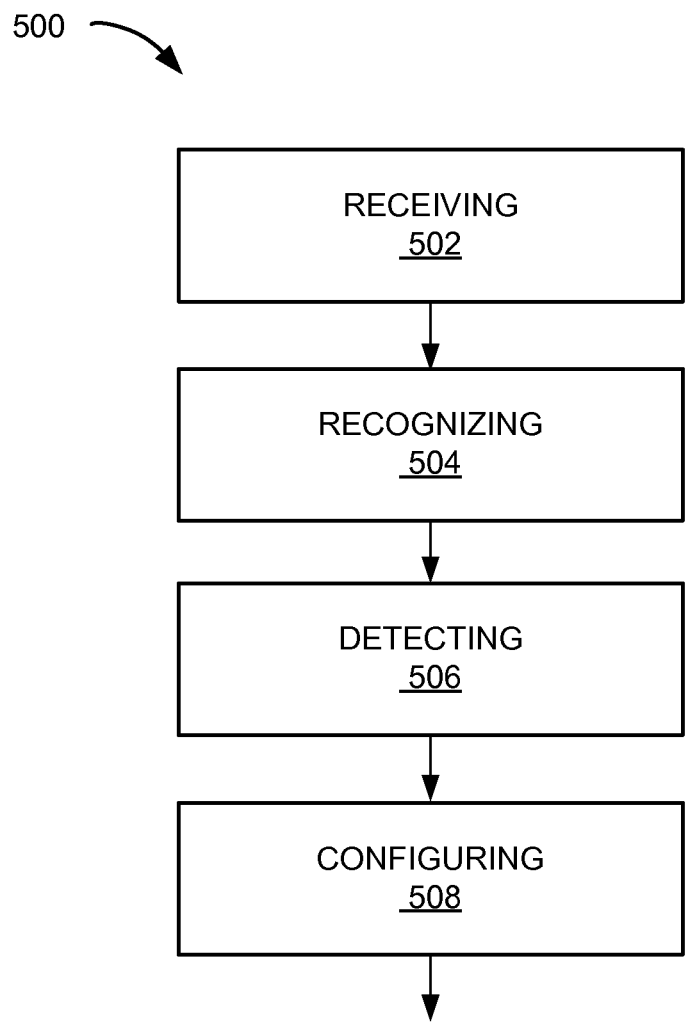
FIG. 5 is a flow chart of a method of operation of the electronic system of FIG. 1 in a further embodiment of the present invention.

Referring now to FIG. 5, therein is shown a flow chart of a method 500 of operation of the electronic system 100 of FIG. 1 in a further embodiment of the present invention. The method 500 includes: receiving a patterned signal in a block 502; recognizing an unique trigger from the patterned signal in a block 504; detecting an operational mode from the unique trigger in a block 506; and configuring a system state change of a memory-sub-system based on the operational mode in a block 508.

Thus, it has been discovered that the electronic system 100 of the present invention furnishes important and heretofore unknown and unavailable solutions, capabilities, and functional aspects for an electronic system with read disturb management mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an electronic system comprising:
   receiving a patterned signal, wherein the patterned signal includes a plurality of unique triggers;
   recognizing a first unique trigger from the plurality of unique triggers in the patterned signal, each unique trigger within the plurality of unique triggers corresponding to a distinct operational mode;
   in response to recognizing the first unique trigger, selecting a first operational mode for a memory sub-system of the electronic system, wherein the first operational mode is a firmware update mode;
   configuring a first system state change of the memory sub-system based on the first unique trigger;
   recognizing a second unique trigger from the plurality of unique triggers in the patterned signal; and
   in response to recognizing the second unique trigger, selecting a second operational mode for the memory sub-system.

2. The method as claimed in claim 1 wherein recognizing the first unique trigger includes recognizing an update signal for updating a firmware of the memory sub-system.

3. The method as claimed in claim 1 wherein recognizing the second unique trigger includes recognizing a version signal for a reversion of a firmware of the memory sub-system.

4. The method as claimed in claim 1 wherein recognizing the second unique trigger includes recognizing a security signal for toggling a security mode of the memory sub-system.

5. The method as claimed in claim 1 wherein recognizing the second unique trigger includes recognizing a manufacturing signal for toggling a manufacturing mode of the memory sub-system.

6. The method as claimed in claim 1 wherein the memory sub-system includes a non-volatile memory array and a memory controller for managing the non-volatile memory array.

7. The method of claim 1, wherein receiving the patterned signal includes accepting the patterned signal in accordance with a determination that the patterned signal was received during an available period for accepting patterned signals.

8. The method of claim 1, wherein receiving the patterned signal comprises monitoring the patterned signal with a signal envelope follower and wherein recognizing the first unique trigger comprises monitoring the first unique trigger with a trigger envelope follower distinct from the signal envelope follower.

9. The method of claim 1, wherein the patterned signal further includes a speed negotiation signal, and wherein recognizing the first unique trigger comprises distinguishing the first unique trigger from the speed negotiation signal.

10. An electronic system comprising:
    a control unit for receiving a patterned signal, wherein the patterned signal includes a plurality of unique triggers;
    a recognizer module, coupled to the control unit, for recognizing a first unique trigger from the plurality of unique triggers in the patterned signal, each unique trigger within the plurality of unique triggers corresponding to a distinct operational mode;
    an operation module, coupled to the recognizer module, for in response to recognizing the first unique trigger, selecting a first operational mode for a memory sub-system of the electronic system, wherein the first operational mode a firmware update mode; and
    a change module, coupled to the operation module, for configuring a first system state change of the memory sub-system based on the first unique trigger;
    recognizing, by the recognizer module, a second unique trigger from the plurality of unique triggers in the patterned signal; and
    in response to recognizing the second unique trigger, selecting, by the operation module, a second operational mode associated with the second unique trigger.

11. The system as claimed in claim 10 wherein recognizing the first unique trigger includes recognizing an update signal for updating a firmware of the memory sub-system.

12. The system as claimed in claim 10 wherein recognizing the second unique trigger includes recognizing a version signal for a reversion of a firmware of the memory sub-system.

13. The system as claimed in claim 10 wherein recognizing the second unique trigger includes recognizing a security signal for toggling a security mode of the memory sub-system.

14. The system as claimed in claim 10 wherein recognizing the second unique trigger includes recognizing a manufacturing signal for toggling a manufacturing mode of the memory sub-system.

15. The system as claimed in claim 10 wherein the memory sub-system includes a non-volatile memory array and a memory controller for managing the non-volatile memory array.

16. The system of claim 10, wherein receiving the patterned signal includes accepting the patterned signal in accordance with a determination that the patterned signal was received during an available period for accepting patterned signals.

17. The system of claim 10, wherein receiving the patterned signal comprises monitoring the patterned signal with a signal envelope follower and wherein recognizing the first unique trigger comprises monitoring the first unique trigger with a trigger envelope follower distinct from the signal envelope follower.

18. The system of claim 10, wherein the patterned signal further includes a speed negotiation signal, and wherein recognizing the first unique trigger comprises distinguishing the first unique trigger from the speed negotiation signal.

* * * * *